Nov. 14, 1939.  J. WOLKOFF  2,179,837
CLUTCH
Filed June 23, 1938
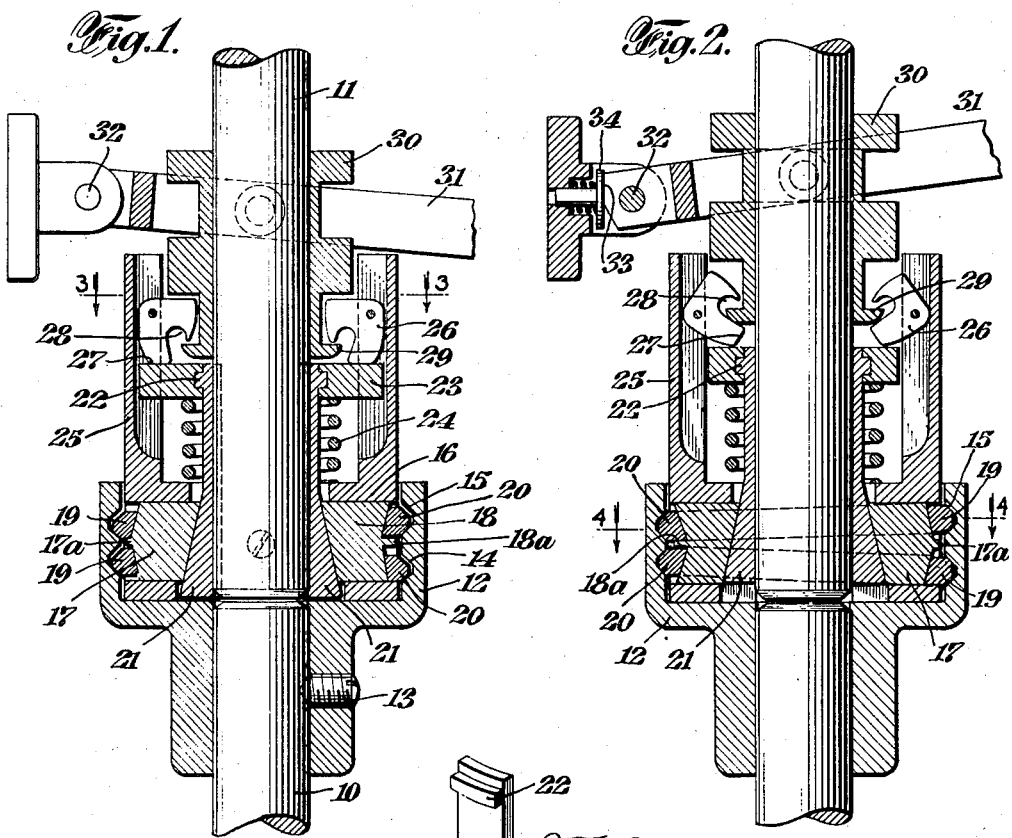
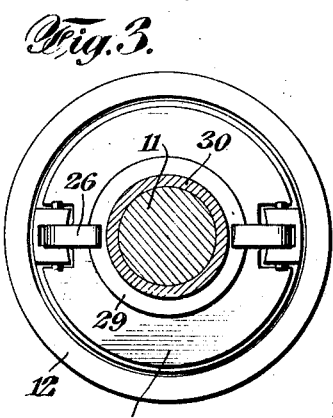
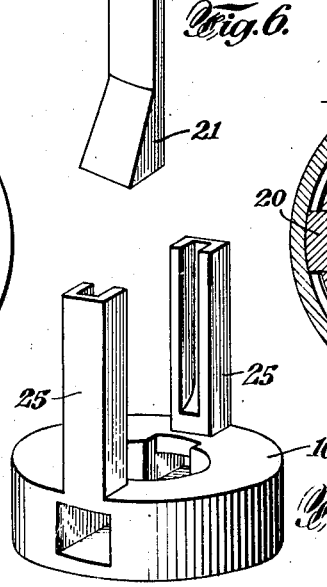
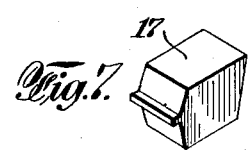
INVENTOR
John Wolkoff
BY Kenyon & Kenyon
ATTORNEYS.

Patented Nov. 14, 1939

2,179,837

UNITED STATES PATENT OFFICE 2,179,837

CLUTCH

John Wolkoff, Newark, N. J.

Application June 23, 1938, Serial No. 215,329

10 Claims. (Cl. 192—76)

This invention relates to clutches.

An object of this invention is a clutch embodying a simple structure and which is highly efficient in operation, as well as comparatively inexpensive to manufacture.

In a preferred embodiment of the invention, a hollow cylindrical member is provided with a pair of annular grooves in its inner periphery, said grooves preferably being angularly related. Surrounded by the cylindrical member is a coaxial rotatable member having two opposed radial channels in each of which is provided a slidable block. Radial movement of said blocks is effected through the medium of wedge means movable axially of said rotatable member and associated with each block is a pair of contact members movable by the block into said grooves, one block and its associated contact members having co-operating surfaces tending to push apart said contact members on outward movement thereof and the other block and its associated contact members having co-operating surfaces tending to draw together said contact members on outward movement thereof. Means are provided for effecting axial movement of said wedge means and for locking said wedge means in declutching position.

Other objects, novel features and advantages of this invention will become apparent from the following specification and accompanying drawing, wherein:

Fig. 1 is a vertical section through an embodiment of the invention with the clutch disengaged;

Fig. 2 is a similar view with the clutch engaged;

Fig. 3 is a section substantially on the line 3—3 of Fig. 1;

Fig. 4 is a section substantially on the line 4—4 of Fig. 2, and

Figs. 5, 6 and 7 are perspective views of individual elements.

The two shafts which are to be joined together by the clutch are designated 10 and 11 respectively. A hollow cylindrical member 12 is fixed to the shaft 10 by a set screw 13 and on its inner periphery is provided with two angularly related grooves 14 and 15.

To the shaft 11 is attached by any suitable means a head 16 having two radially opposed channels, in one of which is provided the slidable block 17 and the other of which is provided the slidable block 18. In one channel for co-operation with the block 18 are two contact members 19, while in the other channel, for co-operation with the block 18, are two more contact members 20. These contact members are movable by their respective blocks into the peripheral grooves 14 and 15 and both the blocks and the groove are provided with straight angularly related surfaces, which are brought into contact for clutching purposes. The contact members 19 are separated by a ridge 17a on the block 17, while the contact members 20 are separated by a ridge 18a on the block 18. The block 17 and the contact members 19 are provided with co-operating surfaces which tend to force the contact members apart upon outward movement of the block 17 while the block 18 and contact members 20 are provided with co-operating surfaces tending to push together the contact members upon outward movement of the block 18.

Wedges 21 are supported by the head 16 for movement axially of the shaft 11 and these wedges coact with the blocks 17 and 18 to move such blocks outwardly upon movement of the wedges in one direction. Each wedge is provided with a rib 22 and a collar 23 has a recess into which the ribs project for locking the collar to the wedges. A coil spring 24 is interposed between the collar 23 and the head 16 and tends to move the wedges into direction to expand the contact members into the grooves.

A pair of arms 25 extend from the head 16 and are provided with longitudinal grooves, the collar 23 being suitably slotted to fit into such grooves. In each arm is pivotally supported a locking member 26 having a flat face 27 for engagement with the collar 23. The locking member is also provided with a finger 28 engageable by a flange 29 on a collar 30. A lever 31 pivoted on pin 32 is connected to the collar 30 for effecting axial movement of the collar to swing the locking members from the position shown in Fig. 1 to the position shown in Fig. 2, thereby permitting expansion of the spring 24. At the end of the lever are provided flat surfaces 33 engageable by a spring-pressed member 34 to hold the lever in either the position shown in Fig. 1 or the position shown in Fig. 2.

With the lever 31 in the position shown in Fig. 1, the locking members 26 have their flat surfaces 27 engaging the collar 23 to hold the wedges 21 in such position that the contact members 19 and 20 ride freely in the grooves 14 and 15 and the shaft 10 is declutched from the shaft 11. In order to engage the clutch, the lever 31 is swung into the position shown in Fig. 2, whereupon the flange 29 moves the locking members to release the collar 23 to permit the spring 24 to move the wedges in the direction to force out the blocks 17 and 18, thereby pressing the contact members 19 and 20 into the grooves 14 and 15. The blocks not only move the contact members outwardly, but also push apart the contact members 19 and push together the contact members 20. The contact members are thus firmly forced into the grooves to clutch the head 16 to the cylindrical member 12 and thus clutch together the two shafts 10 and 11. The angular relation of the grooves 14 and 15, together with the movement apart of the contact members 19 and the movement together of the contact members 20 serves to firmly connect the head 16 to the member 12.

It is of course understood that various modifications may be made in the clutch above described, without in any way departing from the spirit of the invention as defined in the appended claims.

I claim:

1. A device of the character described comprising a hollow cylindrical member having a pair of annular grooves in its inner periphery, a rotatable head coaxial with and surrounded by said cylindrical member, two opposed radial channels in said rotatable head, a slidable block in each channel, wedges movable axially of said rotatable head to effect radial movement of said blocks, and a pair of contact members movable by each block into said grooves, one block and its associated contact members having co-operating surfaces tending to push apart said contact members on outward movement thereof and the other block and its associated contact members having co-operating surfaces tending to push together said contact members upon outward movement thereof.

2. A device according to claim 1 wherein said annular grooves are angularly related.

3. A device of the character described comprising a hollow cylindrical member having a pair of annular grooves in its inner periphery, a rotatable head coaxial with and surrounded by said cylindrical member, two opposed radial channels in said rotatable head, a slidable block in each channel, wedges movable axially of said rotatable head to effect radial movement of said blocks, a spring for moving said wedges in the direction to move said blocks outwardly, locking members pivotally supported by said head adapted in one position to prevent movement of said wedges by said spring, manually operable means for rotating said locking members to release said wedges, and a pair of contact members movable by each block into said grooves, one block and its associated contact members having co-operating surfaces tending to push apart said contact members on outward movement thereof and the other block and its associated contact members having co-operating surfaces tending to push together said contact members upon outward movement thereof.

4. A clutch according to claim 3 wherein said annular grooves are angularly related.

5. A device of the character described comprising a hollow cylindrical member having a pair of annular grooves in its inner periphery, a rotatable head coaxial with and surrounded by said cylindrical member, two opposed radial channels in said rotatable head, a slidable block in each channel, wedges movable axially of said rotatable head to effect radial movement of said blocks, a spring for moving said wedges in the direction to move said blocks outwardly, locking members pivotally supported by said head and having flat surfaces engageable with said wedges to prevent movement thereof by said spring, a flanged collar movable axially of said head, fingers on said locking members engageable by said flange to swing said locking members into inoperative position, and a pair of contact members movable by each block into said grooves, one block and its associated contact members having co-operating surfaces tending to push apart said contact members on outward movement thereof and the other block and its associated contact members having co-operating surfaces tending to push together said contact members upon outward movement thereof.

6. A clutch according to claim 5 in which said annular grooves are angularly related.

7. A device of the character described comprising a hollow cylindrical member having a pair of annular grooves in its inner periphery, a rotatable head coaxial with and surrounded by said cylindrical member, two opposed radial channels in said rotatable head, a slidable block in each channel, wedges movable axially of said rotatable head to effect radial movement of said blocks, a pair of arms extending axially from said head, a collar attached to said wedges, a spring interposed between said head and collar, said collar and arms having inter-related grooves and slots, a locking member in each arm groove pivoted to said arm, said locking members having flat surfaces engageable with said collar, means for effecting rotation of said locking members to release said collar, and a pair of contact members movable by each block into said annular grooves, one block and its associated contact members having co-operating surfaces tending to push apart said contact members on outward movement thereof and the other block and its associated contact members having co-operating surfaces tending to push together said contact members upon outward movement thereof.

8. A clutch according to claim 7 wherein said annular grooves are angularly related.

9. A device of the character described comprising a hollow cylindrical member having a pair of annular grooves in its inner periphery, a rotatable head coaxial with and surrounded by said cylindrical member, two opposed radial channels in said rotatable head, a slidable block in each channel, wedges movable axially of said rotatable head to effect radial movement of said blocks, a pair of arms extending axially from said head, a collar attached to said wedges, a spring interposed between said head and collar, said collar and arms having inter-related grooves and slots, a locking member in each arm groove pivoted to said arm, said locking members having flat surfaces engageable with said collar, a flanged sleeve movable axially of said head, fingers on said locking members engageable by said flanged sleeve to effect rotation of said locking members, and a pair of contact members movable by each block into said annular grooves, one block and its associated contact members having co-operating surfaces tending to push apart said contact members on outward movement thereof and the other block and its associated contact members having co-operating surfaces tending to push together said contact members upon outward movement thereof.

10. A clutch according to claim 9 wherein said annular grooves are angularly related.

JOHN WOLKOFF.